INVENTOR.
EDWARD A. BRASS.
BY Alden D. Redfield
Maurice W. Green
ATTORNEYS.

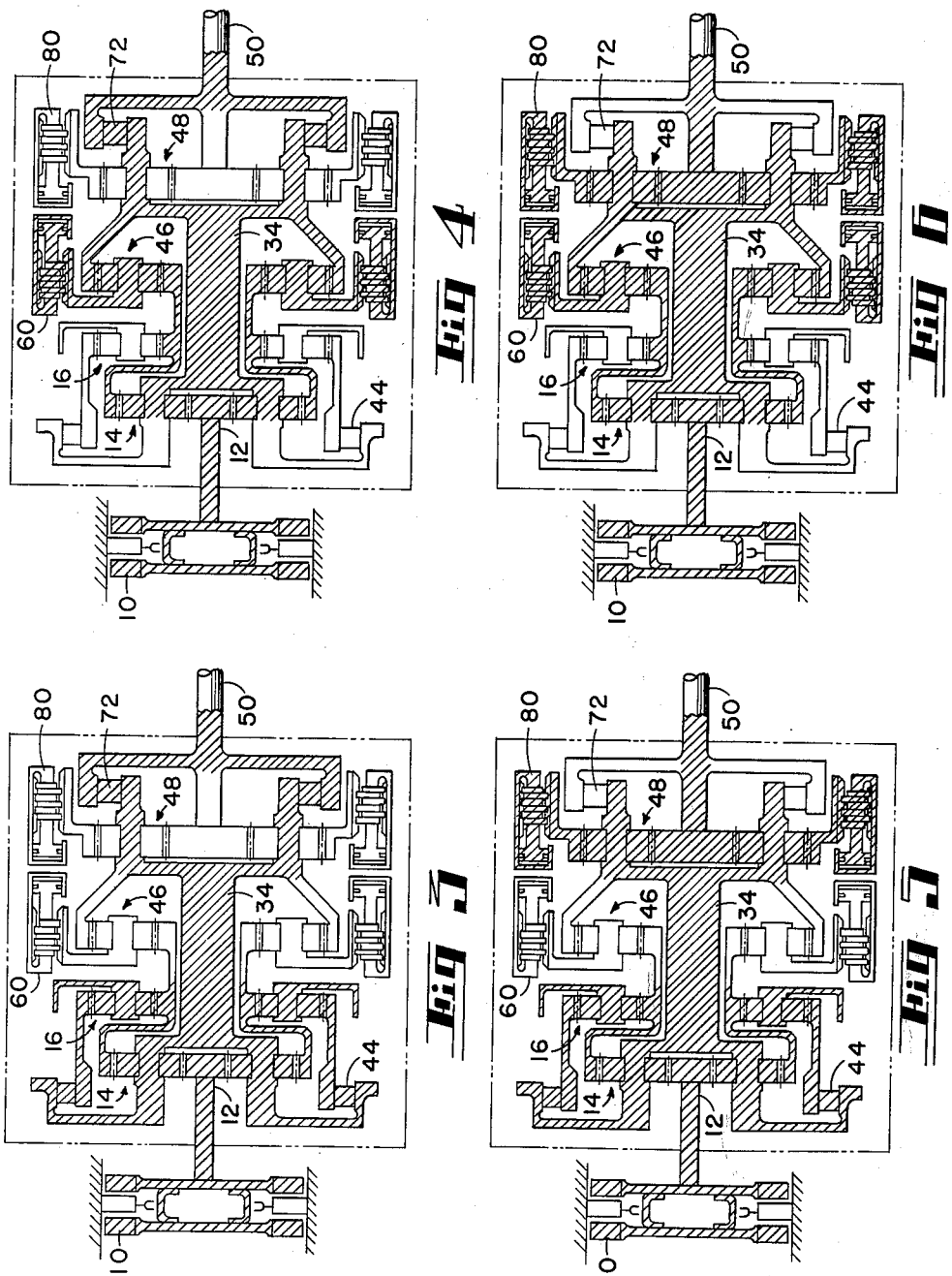

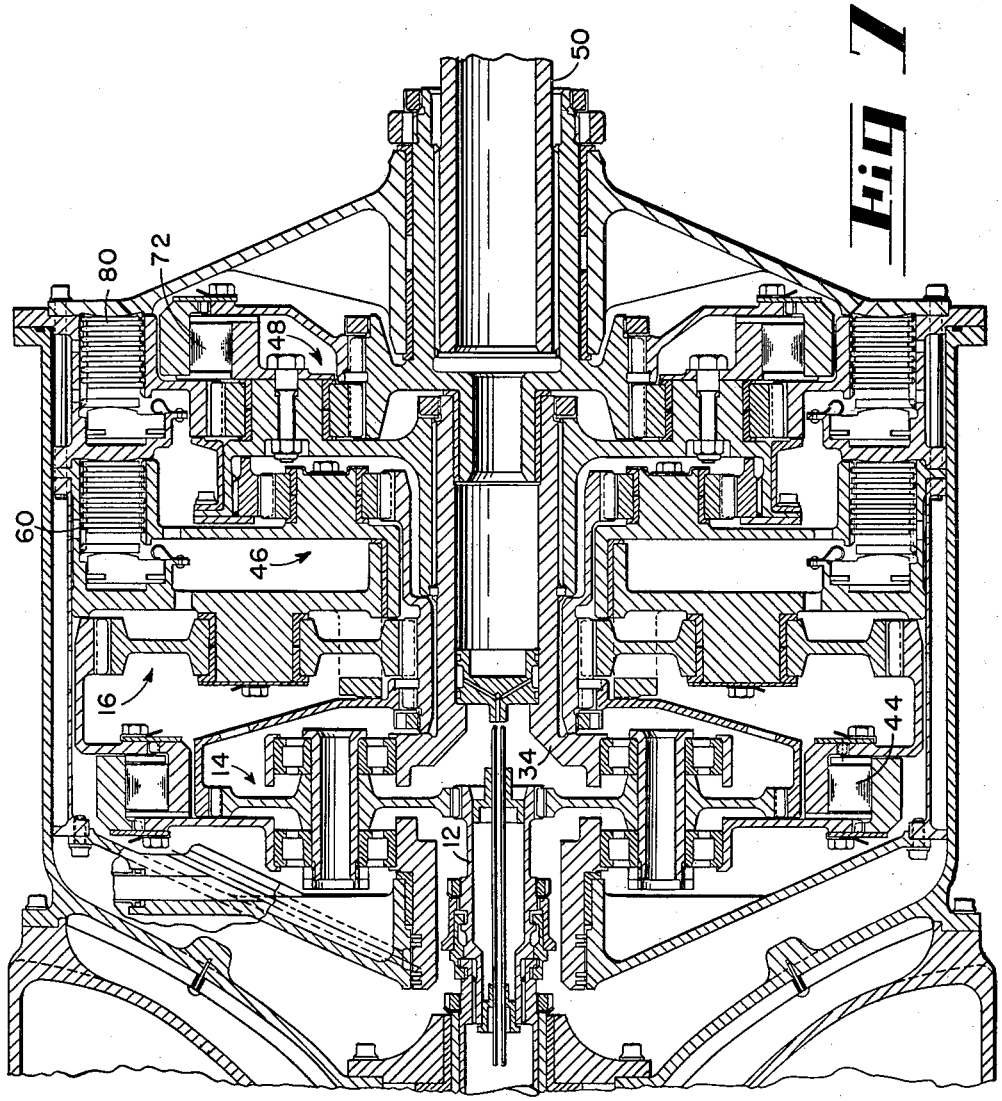

United States Patent Office 3,100,405
Patented Aug. 13, 1963

3,100,405
MULTI-SPEED SPLIT-POWER REDUCTION GEAR
Edward A. Brass, Norwalk, Conn., assignor to Avco Corporation, Stratford, Conn., a corporation of Delaware
Filed Apr. 23, 1962, Ser. No. 189,638
3 Claims. (Cl. 74—764)

This invention relates to a multi-speed split-power gear reduction providing a transmission with a plurality of gear ratios suitable for use in coupling a so-called gas turbine engine with its high r.p.m. of turbine speeds to power consuming units requiring relatively low rotative speeds, and to provide in such an arrangement for a multiple number of gear ratios in a range normally used.

It is the primary object of the invention to provide a multi-speed gear reduction capable of reducing an input with a relatively high rotative speed to various desired lower rotative speeds.

It is a further object to provide means for shifting from one gear ratio to another without uncoupling the load during such shifting.

It is another object to provide a transmission in which a plurality of output rotative speeds are provided and wherein planetary carrier rotative speeds are low.

It is a further object to provide transmission in which the engaging and overrunning speeds on the brakes and clutches are low.

It is another object to preserve the inherent advantages of the split power type of transmission with regard to efficiency, weight and compactness in a transmission providing for a multiple number of speed ratios.

It is a further object to provide a two-speed forward and one-speed reverse transmission of the type affording large step-down in rotative speed and suitable for use with a gas turbine engine.

It is another object to provide a split-power gear reduction of varying gear ratio by selectively rendering desired secondary gear sets operable in a split-power combination by provision of braking elements operable to hold certain elements of specific secondary gear sets from rotation, thereby effecting a substitution of gear sets to complete desired split power gear set combinations resulting in a plurality of gear reductions with desired split-power characteristics and advantages.

The above and other objects of the invention will appear more fully from the following more detailed description of an illustrative structure and by reference to the accompanying drawings forming a part hereof and wherein:

FIGURES 3, 4, 5 and 6 are longitudinal cross sections with shading to show power flow in the several gear ratios available in the schematic of FIGURE 1.

Figure 1:
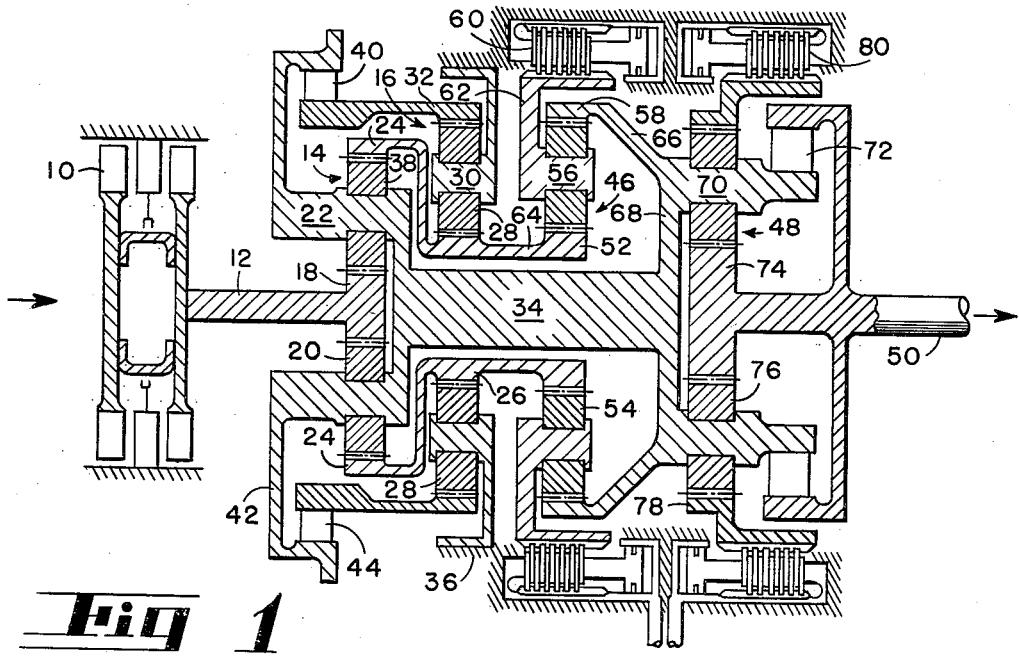
FIGURE 1 is a schematic showing of the multi-speed split-power gear reduction in the form of a longitudinal cross section through the several epicyclic gear sets, showing the split-power combinations made available by selective actuation of brakes.

Specifically, FIGURE 3 shows first gear;
FIGURE 4 shows second gear;
FIGURE 5 shows third gear;
FIGURE 6 shows fourth gear;

FIGURE 7 is a longitudinal cross section through an illustrative embodiment of a structure employing the schematic showing of FIGURE 1.

Referring to the schematic drawing FIGURE 1, reference numeral 10 refers to a gas turbine rotor source of power connected to rotate an input high speed shaft 12. The two gear set stages 14 (a primary stage) and 16 (a secondary stage) correspond to the basic split power arrangement shown in copending application Serial No. 69,064, now Patent No. 3,062,073, filed November 14, 1960, and assigned to the same assignee as this application. The primary gear set stage 14 comprises central gear 18 rotating with the input high speed shaft 12, intermediate gears 20, carrier 22, and ring gear 24. Likewise, the secondary stage 16 comprises a central gear 26, intermediate gears 28, a carrier 30, and a ring gear 32. The carrier 22 is connected to and rotates with output shaft section 34, while the carrier 30 of the secondary stage is a stationary carrier held from rotation by connection to the housing 36, as shown. The primary stage ring gear 24 is connected in positive rotative connection with the secondary stage central gear 26 by the connection 38. The secondary stage ring gear 32 is connected to the output shaft 34 by connection with the carrier 22 through the connections 40, 42 and overrunning clutch 44. The primary and secondary stages and connections, above described, comprise the split-power gear set reduction as set forth in the copending application above identified. A power flow through these two stages to the output shaft section 34 provides first gear of this transmission. Additional gear set stages 46, 48, shown in schematic FIGURE 1, rotate during this first gear actuation to rotate the output shaft section 50 at the same rotative speed as the shaft section 34, as will later appear.

In order to accomplish a second gear, the first additional gear set stage 46 is provided to replace the secondary gear set stage 16. This first additional gear set stage 46 comprises a central gear 52, intermediate gears 54, carrier 56, ring gear 58, brake 60, with connector 62 between carrier 56 and brake mechanism 60. The central gear 26 of the secondary gear 16 is connected to the central gear 52 of the first additional gear set stage 46 by the connector 64. The first additional gear set stage 46 is put in actuation by fluid pressure, or similar means, of the brake 60, which causes the normally free carrier 56 to be held from rotation and thereby supplies a fixed carrier for the first additional gear set stage 46 and this results in the substitution of the gear set stage 46 for the secondary gear set stage 16. The secondary gear set stage 16 freely rotates because of the difference in rotation direction imposed on the ring gear 32 and the fact that the overrunning clutch 44 no longer holds the connection of the ring gear 32 to the output shaft. Therefore, the effect of the actuation of the brake 60 is to make a new split-power set comprising the primary gear set stage 14 and the first additional gear set stage 46. The split-power flow in this arrangement is from the carrier 22 of the primary gear set stage 14 to the output shaft section 34 for one portion of the drive and the other portion through the gear set stage 46 from the ring gear 58 through a connector 66 to the output shaft 34 through the further connecting portion 68, the carrier 70 simply rotating the second additional gear set stage 48 through the one-way clutch 72 to the output shaft without any speed change through the second additional gear set stage 48. The second additional gear set stage 48 is likewise made up of a central gear 74, intermediate gears 76, ring gear 78. The intermediate gears 76 are carried on the carrier 70, previously mentioned. When it is desired to effect a third gear speed, the brake 80 is actuated. This brake holds the second additional gear set stage ring gear 78 from rotation and thereby causes actuation of the second additional gear set stage 48 to effect drive through the gear set stage 48 to the second section 50 of the output shaft.

The fourth gear is accomplished by the actuation of both the brake 60 and 80, thereby providing a transmitted power path through gear set stage 14 and both the first and second additional gear set stages 46 and 48.

FIGURES 3, 4, 5 and 6 are reproductions of the schematic drawing of FIG. 1 but with the parts shaded to show the actuation accomplishing the several gear ratios; specifically, FIG. 3 shows power flow for the first gear ratio; FIG. 4 shows the power flow for the second gear ratio, FIG. 5 shows the power flow for the third gear ratio, and FIG. 6 shows the power flow for the fourth gear ratio.

FIGURE 7 is a cross sectional view of an illustrative embodiment of a structure employing the schematic showing of FIGURE 1. Like reference numerals have been applied showing the principal parts of the transmission, as called for in FIGURE 1.

It is one of the major advantages of the split-power arrangement that, starting with a very high input shaft r.p.m., which is characteristic of a gas turbine installation, the desired gear reduction is accomplished with the split-power arrangement by components of gear sets and their necessary operating elements, none of which rotate at an objectionable high speed of rotation. The following table illustrates this fact by designating the input shaft r.p.m. of 42,600 with the resulting r.p.m.'s of certain of the components of the transmission. It is particularly to be noted that the several carriers rotate at relatively low speeds and in no case is the rotative speed of any of the parts objectionably high.

|  | 1st | 2nd | 3rd | 4th |
| --- | --- | --- | --- | --- |
| Input high speed shaft 12 | 42,600 | 42,600 | 42,600 | 42,600 |
| Output low speed shaft 50 | 1,160 | 2,000 | 5,480 | 6,000 |
| Primary carrier 22 | 1,160 | 2,000 | 1,160 | 2,000 |
| Secondary central gear 26 and primary ring gear 24 | −5,160 | −4,180 | −5,160 | −4,180 |
| Secondary ring gear 32 | +1,160 | +960 | +1,160 | +960 |
| 1st additional carrier 56 | −885 | 0 | −885 | 0 |
| 2nd additional carrier 70 | +1,160 | +2,000 | +1,160 | +2,000 |
| Primary intermediate 20 | −14,900 | −14,600 | −14,900 | −14,600 |
| Secondary intermediate 28 | +3,000 | +2,420 | +3,000 | +2,420 |
| 1st additional intermediate 54 | +7,880 | +7,710 | +7,880 | +7,710 |

Figure 2:
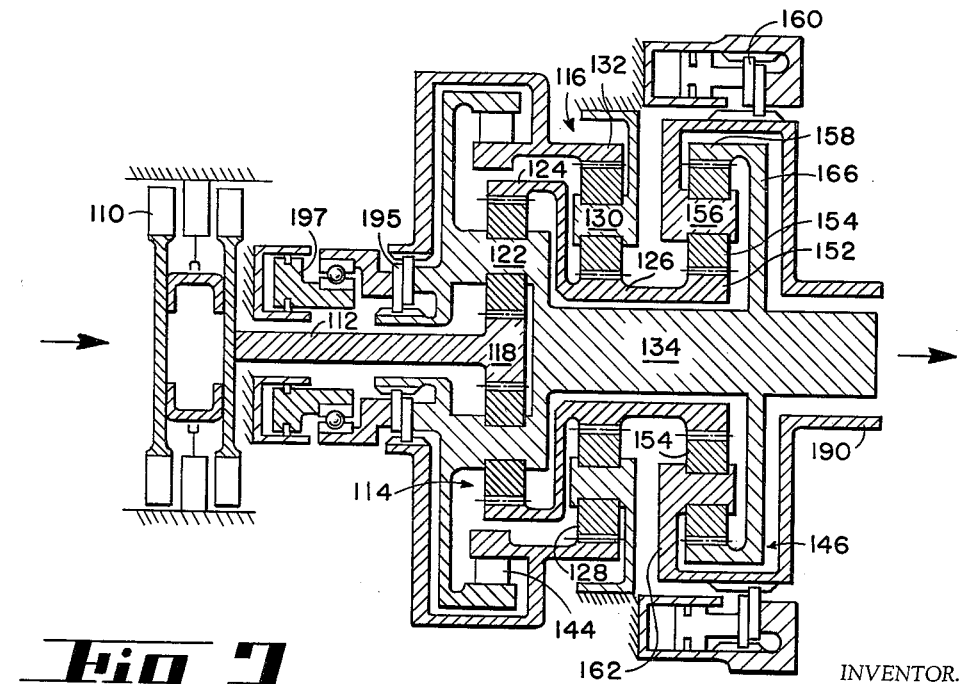
FIGURE 2 is a schematic showing of a modified form of multi-speed split-power gear reduction affording two speeds, forward plus reverse, in the form of a longitudinal cross section.

Referring to FIGURE 2, a modified form of the invention is shown, wherein the second additional gear set stage 48 is removed and the mechanism here shown is made up of the basic split power and primary and secondary gear sets 114 and 116. The turbine wheel source of power 110 rotates the high speed input shaft 112 to drive the central gear 118, intermediate gears 120, ring gear 124, with the carrier 122 making up the primary gear set stage 114, while the secondary gear set stage has a fixed carrier 130, central gear 126, intermediate gears 128, and ring gear 132. The output shaft 134 carries the primary stage carrier 122 in rotation while the secondary carrier 130 is fixed, as peviously mentioned. The first additional gear set stage 146 is made up of central gear 152, intermediate gears 154, ring gear 158, and carrier 156. The central gear 126 is connected to the central gear 152 by the connection 164 while the ring gear 158 is connected to the output shaft 134 through the connection 166. The brake actuator 160, when hydraulically or similarly actuated, grounds and holds from rotation the carrier 156 through the connection 162. The carrier 156 and the connection 162 has connected thereto an extension shaft 190 which is for the purpose of accomplishing a reverse rotation if connection is made thereto when the gear set stage carrier 156 is free to rotate. The one-way overrunning clutch 144 releases the connection of secondary ring gear 132 from carrier 122 and output shaft 134 when brake 160 is actuated. A friction clutch 195 with hydraulic or similar actuator 197 parallels the overrunning clutch 144 to provide the connection of the secondary ring gear 132 and the carrier 122 when the power is extracted from the reverse output shaft 190.

The invention has been described by reference to the specific illustrative structure and it is intended that modifications may be made without departing from the fundamental principles and within the scope of the following claims:

I claim:
1. In combination with a split-power gear set reduction between an input and output shaft of the type employing a primary and a secondary gear set stage each with a central gear, intermediate gears, a carrier, and a ring gear, the primary gear set carrier being planetary and rotating with the output shaft and the secondary gear set stage having a fixed carrier, such two gear set stage split-power arrangement employing a drive connection between the input shaft and the primary stage central gear, and a second drive connection between the primary stage ring gear and the secondary stage central gear, and a rotative connection between the secondary stage ring gear and the output low speed shaft, the combination therewith of:
   at least one additional gear set stage in axial alignment with said input and output shaft and with said primary and secondary gear set stages, said additional gear set stage comprising a central gear intermediate gears, and a ring gear;
   with a carrier for said intermediate gears;
   a positive connection between said second stage central gear and said additional stage central gear;
   and a positive connection between said output low speed shaft and said additional stage ring gear;
   a brake selectively actuable to hold said additional gear set stage carrier from rotation or to allow free rotation thereof;
   said rotative connection comprising a one-way drive connection between said second stage ring gear and said first stage carrier effecting rotative connection of said second stage ring gear to said first stage carrier and said output shaft only when drive is in direction effected when said additional gear set carrier is allowed freedom of rotation.

2. Mechanism as in claim 1 in which an outlet shaft connection is provided to afford a shaft rotatable concentric with said output shaft and connected to rotate with said additional stage carrier, whereby a reverse speed rotation is provided by said concentric shaft when said brake allows freedom of rotation of said additional gear set stage.

3. Mechanism as in claim 1 in which a second additional gear set stage is provided between first and second sections of said output shaft, said additional gear set stage comprising:
   a central gear;
   intermediate gears;
   and a ring gear with a carrier for intermediate gears;
   connection between said first additional gear set stage ring gear and said second additional gear set stage carrier;
   said second additional gear set stage carrier also being connected for rotation with said first section of said output shaft;
   a brake connecting said second additional gear set stage ring gear for selective actuation to hold said second additional gear set stage ring gear from rotation or to allow free rotation thereof;
   a one-way drive connection between said second additional gear set stage carrier and the second section of said output shaft, effecting drive connection when rotation direction is that afforded when said second additional gear set stage brake allows free rotation of said second additional gear set stage ring gear;
   a connection between said second section of said output shaft and said additional gear set stage central gear.

No references cited.